United States Patent [19]

Kanno et al.

[11] Patent Number: 4,731,820
[45] Date of Patent: Mar. 15, 1988

[54] DATA TRANSMISSION SYSTEM OF KEY TELEPHONE SYSTEM

[75] Inventors: Kenichi Kanno; Senji Okumura; Hisami Ojima, all of Tokyo, Japan

[73] Assignee: Tamura Electric Works, Ltd., Tokyo, Japan

[21] Appl. No.: 29,311

[22] Filed: Mar. 23, 1987

[30] Foreign Application Priority Data

Apr. 7, 1986 [JP] Japan ............................... 61-78365

[51] Int. Cl.[4] ........................................... H03M 7/00
[52] U.S. Cl. ...................................... 379/165; 371/5; 371/37; 375/17
[58] Field of Search ................. 379/165, 166; 375/17, 375/19; 371/5, 37, 55, 56

[56] References Cited

U.S. PATENT DOCUMENTS

| | | | |
|---|---|---|---|
| 3,573,729 | 4/1971 | Gunn et al. | 371/56 |
| 3,631,471 | 12/1971 | Griffiths | 371/55 X |
| 3,828,346 | 8/1974 | Forster et al. | 375/19 X |
| 3,840,855 | 10/1974 | Ameau et al. | 371/55 X |
| 4,309,694 | 1/1982 | Henry | 371/55 X |
| 4,367,550 | 1/1983 | Douverne | 371/5 |
| 4,387,461 | 6/1983 | Evans | 371/5 |
| 4,475,212 | 10/1984 | McLeon et al. | 371/56 X |
| 4,514,597 | 4/1985 | Kikuchi et al. | |
| 4,541,091 | 9/1985 | Nishida et al. | 371/5 X |
| 4,564,726 | 1/1986 | Ibata | |
| 4,580,262 | 4/1986 | Naylor et al. | 371/5 |
| 4,598,326 | 7/1986 | Leiner | 375/19 X |
| 4,675,867 | 6/1987 | Masui et al. | 371/5 X |
| 4,688,225 | 8/1987 | Fukomi et al. | 371/37 |
| 4,696,007 | 9/1987 | Moriyana | 371/37 |
| 4,697,265 | 9/1987 | Nozue | 375/17 X |

Primary Examiner—Jin F. Ng
Assistant Examiner—Matthew E. Connors
Attorney, Agent, or Firm—Perman & Green

[57] ABSTRACT

Disclosed is a system for transmitting data by a data pulse train obtained by a combination of "0" or "1" bit pulse signals through a pair of lines connected beween a main unit and a key telephone set. The system includes a counter for sampling the pulse train and counting "0" or "1" bit pulse signals; a comparator for comparing a count of the counter with a reference value; and a correcting section for adding "0" or "1" correction pulses so as to set the count to be the reference value when the count is different from the reference value.

15 Claims, 13 Drawing Figures

4,731,820

DATA TRANSMISSION SYSTEM OF KEY TELEPHONE SYSTEM

BACKGROUND OF THE INVENTION

The present invention relates to a data transmission system of a key telephone system.

In a conventional key telephone system, a main unit of the key telephone system is connected to a key telephone set through a pair of speech lines and a pair of signal lines.

When the pulse signal which is changed simply in the negative direction is used, transformer characteristics and distributed capacitance of the signal lines cause decreases in reference levels upon transmission of the pulse signals. When power is transmitted from the main unit to the key telephone set, a worse influence is effected to keep the above-mentioned reference level constant. At the receiving end, detection of the pulse signal by comparison with a reference voltage is inaccurate. In order to solve this problem, U.S. Pat. No. 4,564,726 (issued on Jan. 14, 1986) describes a means for transmitting data by using a positive- and negative-direction pulse signal, that is by using the double current method so as to cancel the changes in reference levels.

However, when the positive- and negative-direction pulse signals are used, the number of positive pulses is not always equal to that of negative pulses at the time of data coding due to the contents of data. If the number of positive pulses is larger than that of negative pulses and vice versa, the DC component is generated according to the average value of the pulses. Therefore, the reference level is changed, and the detection conditions at the receiving end become undesirably unstable.

SUMMARY OF THE INVENTION

It is, therefore, a principal object of the present invention to provide a data transmission system of a key telephone system, wherein pulse signal detection conditions at a receiving end are assured.

In order to achieve the above object of the present invention, there is provided a system for transmitting data by a data pulse train obtained by a combination of "0" or "1" bit pulse signals through a pair of lines connected between a main unit and a key telephone set, comprising: counting means for sampling the pulse train and counting "0" or "1" bit pulse signals; comparing means for comparing a count of the counting means with a reference value; and correcting means for adding "0" or "1" correction pulses so as to set the count to be the reference value when the count is different from the reference value.

According to the present invention, a pulse which is changed in the positive or negative direction is inserted at every given interval according to the number of pulses which is changed in the negative or positive direction. Therefore, a change in average value of pulses changing in the negative or positive direction is cancelled.

DESCRIPTION OF THE PREFERRED EMBODIMENT

The NRZ scheme as one of the double current methods is applied to the following embodiment.

FIGS. 1A to 1I are timing charts of pulse signals to explain the transmission conditions. Pulses which are changed in the positive and negative directions with respect to a voltage Vp represent bits. Bits B1 to B8 constitute a data word D. At the same time, a correction pulse Pc is inserted next to the data word D. The correction pulse Pc consists of bits B11 to B14.

FIG. 1A shows a pulse signal having the data word D whose bits B1 to B8 are negative-direction pulses. In order to prevent the average value of the bits B1 to B8 from shifting from a reference level Vp, all the bits B11 to B14 of the correction pulse are positive-direction pulses. Referring to FIGS. 1B to 1I, the number of positive-direction bits of the data word D is gradually increased. Referring to FIGS. 1D to 1I, the number of negative-direction bits in the correction pulses Pc is accordingly increased. Therefore, the average value of the positive-direction bits of the data word D is prevented from being shifted from the reference level in each pulse signal.

However, the conditions of the correction pulses are not changed according to the numbers of positive-direction bits of the data words in FIGS. 1A to 1C and 1G to 1I. In this case, perfect cancellation is not performed. However, in the above bit-direction scheme, in principle, six positive-direction bits and six negative-direction bits constitute the data word D and the correction pulse Pc. According to this principle, the number of negative-direction bits in the correction pulse Pc in each of FIGS. 1C to 1G is determined. Therefore, among possible combinations of positive- and negative-direction bits in the data words D, 97% of the average values are not changed.

The number of possible combinations of the positive- and negative-direction bits constituting the data word D (8 bits) is 256. The number of combinations shown in FIGS. 1A, 1B, and 1G to 1I is only 18. If the correction pulses Pc shown in FIGS. 1C to 1G are inserted to equivalently obtain 256 codes with an identical probability, the number of positive-direction bits is equal to that of negative-direction bits in 97% of the 256 codes. Therefore, changes in average values rarely occur.

However, if the number of bits of the correction pulse Pc is increased, perfect cancellation in all codes can be achieved. In this case, no change occurs in the average values.

The number of correction pulses is a constant or a value proportional to the number of data bits at a given rate. Alternatively, the number of correction pulses may be a multiple of 4 bits determined by the number of bits processed by the CPU.

Figure 2:
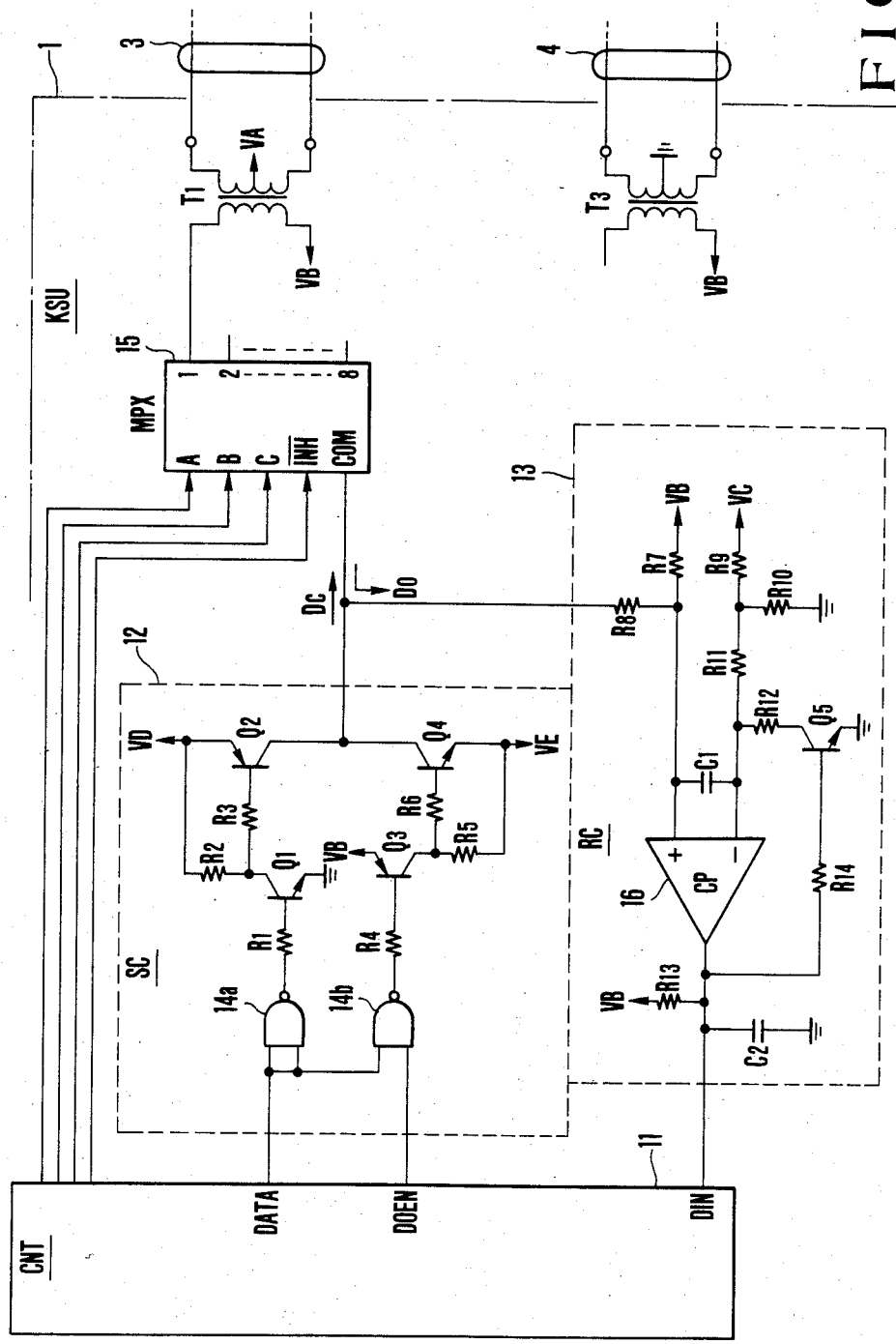
FIG. 2 is a circuit diagram of a transmitter and a receiver in a main unit.

FIG. 2 shows a transmitter and a receiver in a main unit (to be referred to as a KSU hereinafter) 1 constituting a key telephone system. A control circuit (to be referred to as a CNT hereinafter) 11 including a microprocessor and a memory controls a transmitter (to be referred to as a SC hereinafter) 12 and receives data from a receiver (to be referred to as an RC hereinafter) 13. When control data is sent to a key telephone set (to be referred to as an ST hereinafter) (described later), the CNT 11 outputs an "H" (high level) control signal from a terminal DOEN and outputs control data from a terminal DATA. The control data repeats "H" and "L" (low level). The control data is inverted by a NAND gate 14a in the SC 12. The inverted data is applied to the base of a transistor (to be referred to as a TR hereinafter) Q1 through a resistor R1. The collector voltage of the TR Q1 applied with a positive power source voltage Vd through a resistor R2 repeats "L" and "H" in response to the ON and OFF operations of the TR Q1. The collector voltage is applied to the base of a TR Q2 through a resistor R3, and thus the TR Q2 repeats the ON and OFF operations in synchronism with the TR Q1.

A NAND gate 14b is enabled in response to the "H" control signal and gates the control data. At the same time, the control data is inverted, and the inverted data is applied to the base of a TR Q3 through a resistor R4. The ON/OFF timing of the TR Q3 is opposite to that of the TR Q1. The collector voltage connected to a negative power source voltage Ve through a resistor R5 is sequentially set at "L" and "H". The collector voltage is applied to the base of a TR Q4 through a resistor R6. The ON/OFF timing of the TR Q4 is synchronized with that of the TR Q3 and is complementary to that of the TR Q2.

If the terminal DATA is set at "L", the TR Q2 is ON, and the TR Q4 is OFF. A complementary single ended push-pull output stage constituted by the TRs Q2 and Q4 causes the common collector node of the TRs Q2 and Q4 to set at "H". However, if the terminal DATA is set at "H", the TR Q2 is turned off and the TR Q4 is turned on. In this case, the common node is set at "L". In response to changes in logic levels "H" and "L" of the terminal DATA, the common node is sequentially set at "L" and "H". Changes in voltages are supplied as positive- and negative-direction transmission pulses to a common terminal COM of a multiplexer (to be referred to as an MPX hereinafter) 15.

A switching signal is supplied from the CNT 11 to selection terminals A to C of the MPX 15. An inhibition signal is supplied to an inhibition terminal $\overline{INH}$ of the MPX 15. When the inhibition signal is not supplied to the terminal $\overline{INH}$, output terminals 1 to 8 are sequentially selected in response to the switching signal, and control data Dc from the SC 12 is sent onto a signal line 3 through a line transformer T1 arranged in correspondence with each ST. At the same time, operation data Do from each ST is supplied to the RC 13 through the line in a direction opposite to the transmission direction of the control data Dc.

A line transformer T1 for the signal lines 3 and a line transformer T3 for speech lines 4 are arranged in units of STs. Each winding on the transmission line side has a center tap. A power source VA and a common circuit are connected to each line transformer T1 or T2. A phantom voltage is supplied to each ST through the signal and speech lines 3 and 4.

The pulse control data repeating the "H" and "L" levels and the operation data are superposed on the DC power source voltage. If the control data represents an "H" pulse, a positive-direction bit is generated. A negative-direction bit is generated in response to the "L" pulse. For example, "H" represents logic level "1", and "L" represents logic level "0".

When the operation data is supplied to the RC 13 while the SC 12 does not transmit data and the TRs Q2 and Q4 are thus kept off, operation data Do is supplied to the noninverting input terminal of a comparator (to be referred to as a CP hereinafter) 16 through a resistor R8. The operation data Do is compared with a reference voltage supplied to the inverting input terminal of the CP 16. Note that, in this case, a voltage from a power source VB is supplied to the CP 16 through a resistor R7.

A voltage from a power source VC is applied to the inverting input terminal of the CP 16 through a voltage divider consisting of resistors R9 to R12. The voltage from the power source VB is applied to the output terminal of the CP 16 through a resistor R13. The output from the CP 16 is normally kept "H". The "H" output from the CP 16 drives a TR Q5 through a resistor R14. A reference voltage obtained by dividing the voltage from the power source VC by the resistors R9 to R12 is applied to the inverting input terminal of the CP 16.

For this reason, if the operation data is higher than the reference voltage, the output from the CP 16 is kept "H". However, if the voltage represented by the operation data is lower than the reference voltage, the output from the CP 16 goes to "L", and thus the TR Q5 is turned off. The voltage division action of the resistors R11 and R12 is cancelled, and the reference voltage is increased. The "L" output is kept until the voltage represented by the operation data is reduced.

Switching of the reference voltage level prevents the CP 16 from a detection error due to a noise mixture and a change in reference level of the transmission waveform, the change being caused by the characteristics of the line transformer T1 inserted across the signal lines 3 and by distributed capacitance of the signal lines 3.

Changes in voltages of the operation data are detected as a repetition of "H" and "L" by the CP 16. This output from the CP 16 is supplied to a terminal DIN of the CNT 11 to allow the CNT 11 to decode the operation data. Control is performed according to the decoded contents. At the same time, control data is generated.

A capacitor C1 inserted across the input terminals of the CP 16 and a capacitor C2 connected to the output terminal of the CP 16 serve to reduce noise components.

Figure 3:
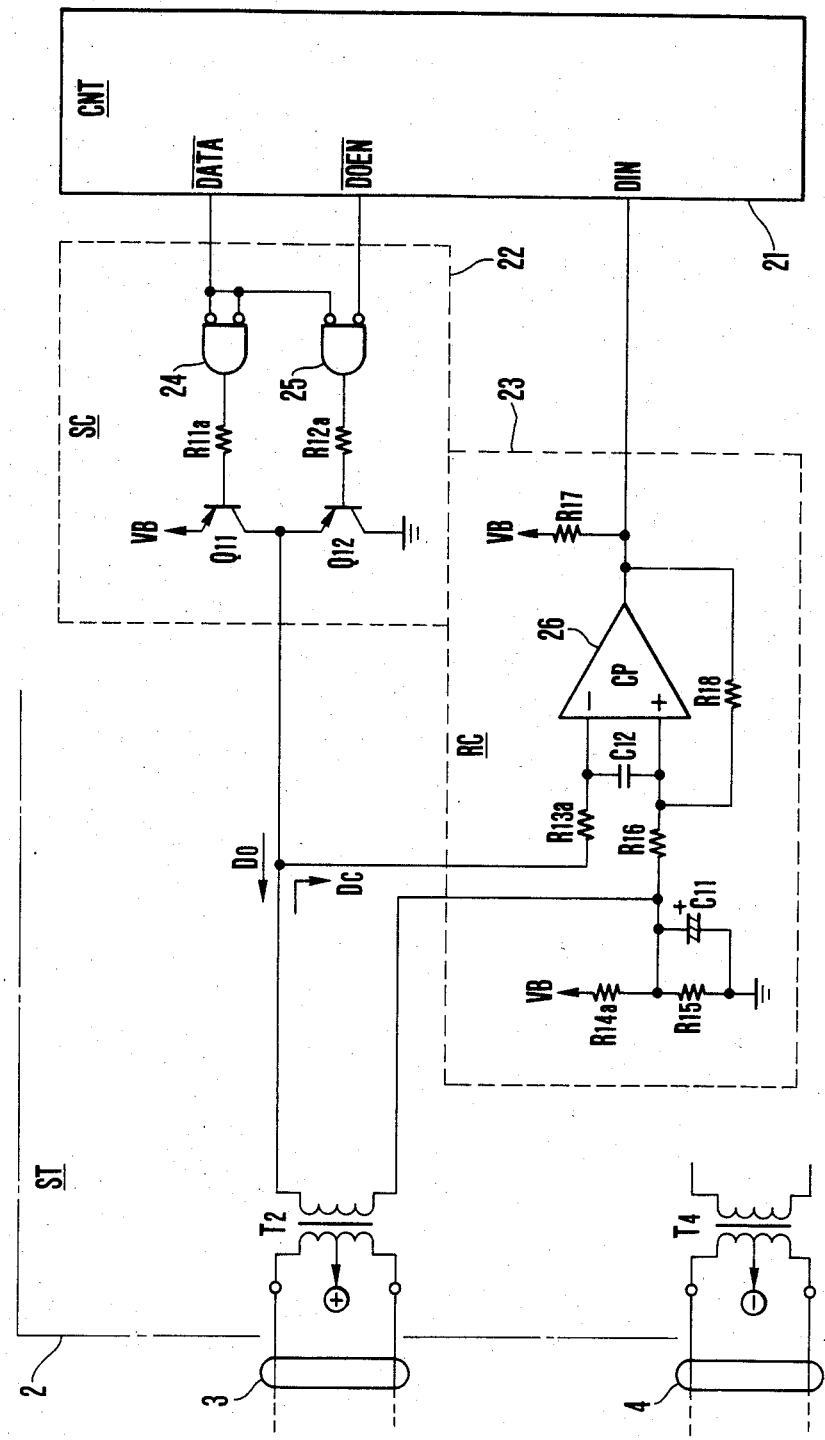
FIG. 3 is a circuit diagram of a transmitter and a receiver in a key telephone set.

FIG. 3 shows a transmitter and a receiver in the ST 2. This circuit arrangement is similar to that of the CNT 11 in the KSU 1. However, the scale of a CNT 21 in the ST 2 is smaller than that of the CNT 11, thereby controlling an SC 22 and receiving data from an RC 23. The SC 22 comprises a complementary single ended push-pull output stage of TRs Q11 and Q12, and NAND gates 24 and 25 in the same manner as in the SC 12 in the KSU 1. When operation data is sent, an "L" control signal appears at a terminal $\overline{DOEN}$ of the CNT 21 and operation data repeating "L" and "H" appears at a terminal $\overline{DATA}$ of the CNT 21. If the operation data represents "L", this data is inverted by the NAND gate 24 into an "H" signal. The "H" signal disables a TR Q11 through a resistor R11a. In response to the "L" control signal, the NAND gate 25 is turned on. An output from the CNT 21 goes to "H" to turn on a TR Q12 through a resistor R12a. A common collector node between the TRs Q11 and Q12 goes to "L", and the operation data goes to "H". Outputs from the NAND gates 24 and 25 are set at "L". In this case, the TRs Q11 and Q12 are turned on and off, respectively, and the common node is set at "H".

A change in voltage at the common node appears as a transmission signal of the operation data Do onto the signal lines 3 through a line transformer T2.

One end of the secondary winding of the line transformer T2 is connected to the common collector node in the SC 22 and to a CP 26 in the RC 23 through a resistor R13a. The other end of the secondary winding of the line transformer T2 is connected to a voltage division output terminal of a voltage divider consisting of resistors R11a and R15 in the RC 23. The "H" and "L" levels of the transmission signals are determined with respect to the divided voltage and are sent as positive- and negative-direction bits to the KSU 1.

In the nontransmission mode wherein both TRs Q11 and Q12 in the SC 22 are kept off, when control data Dc is sent to the ST 2, the data Dc is supplied to the inverting input terminal of the CP 26 through the resistor 13a and is compared with the reference voltage supplied to the noninverting input terminal of the CP 26 through a resistor R16.

The voltage from the power source VB is supplied to the output terminal of the CP 26 through a resistor R17. In the normal mode, the output from the CP 26 is kept "H". A positive feedback resistor R18 is connected between the output terminal and the noninverting input terminal of the CP 26. The CP 26 receives a reference voltage consisting of the divided voltage and an output voltage through a resistor R18.

For this reason, if the output from the CP 26 is set at "H", the reference voltage is increased. However, if the output from the CP 26 is set at "L", the reference voltage is reduced in the same manner as in the RC 13 in the KSU 1.

If a voltage represented by the control data is higher than the high reference voltage, the output from the CP 26 goes to "L". The reference voltage is decreased accordingly. However, if the voltage represented by the control data is lower than the reference voltage, the output from the CP 26 is set at "H", thereby increasing the reference voltage. The control data is detected as "H" and "L" changes which represent the positive- and negative-direction bits. These bits are supplied to the terminal DIN of the CNT 21 and are decoded to control the constituting components.

A capacitor C11 connected in parallel with a resistor R15 is arranged for an AC component line, and a capacitor C12 connected across the input terminals of the CP 26 serves to eliminate noise components.

A center tap is formed in the winding of the signal/speech line side of each of line transformers T1 and T4 in the same manner as in the KSU 1. Power source voltages ⊕ and ⊖ are extracted from the center taps, respectively. These voltages are stabilized by a power source circuit (not shown) and the stabilized voltages are supplied to the corresponding components.

Figure 4:
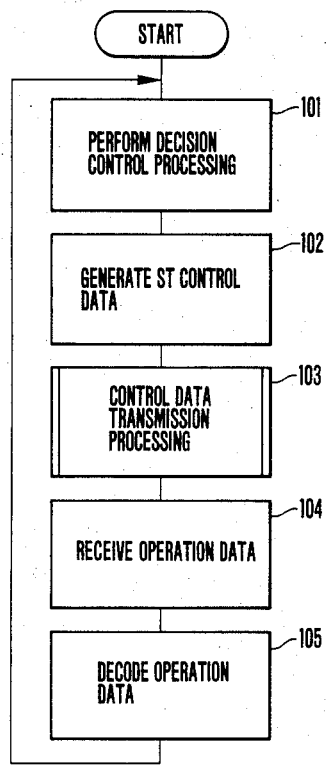
FIG. 4 is a flow chart for explaining the overall control conditions of a control circuit in the main unit.

FIG. 4 is a flow chart showing the control conditions of the CNT 11 in the KSU 1. A processor (to be referred to as a CPU hereinafter) in the CNT 11 accesses a memory for necessary data.

Decision control processing step 101 is executed to control all components in the KSU 1. ST control data is generated in step 102 after step 101 is completed. Control data transmission processing is performed in step 103 to control the SC 12 for transmitting control data to each ST 2. Operation data reception processing for receiving data from each ST 2 is executed in step 104. The operation data is then decoded in step 105 upon reception of the output from the RC 13. The operations in step 101 and the subsequent steps are repeated at a predetermined interval.

Figure 5:
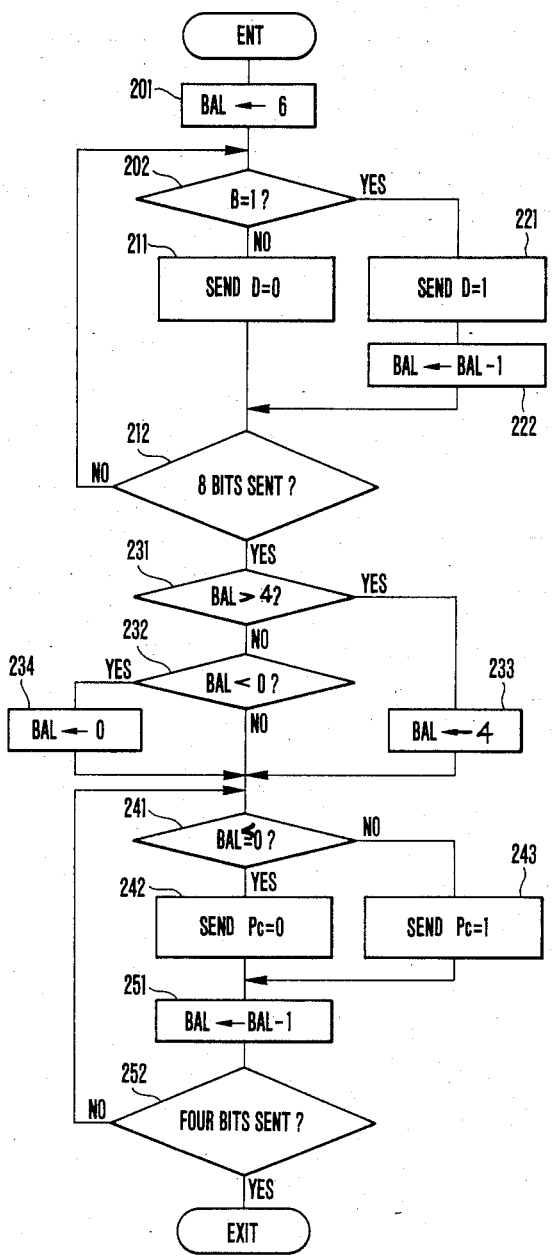
FIG. 5 is a detailed flow chart of the control conditions in FIG. 4.

FIG. 5 is a detailed flow chart of step 103. A count value BAL of a soft counter in the CPU is set to be 6 in step 201. The bits B1 to B8 of the data word D (FIG. 1) are sequentially read out and sampled. If each sampled value represents logic level "1", e.g., the positive-direction pulse, the CPU determines in step 202 whether the logic value of each bit B is "1". If NO in step 202, the logic value is determined to be "0", i.e., the negative-direction logic level. The data word D (=0) is sent out in step 211. The number of sent bits is counted by another counter arranged in the CPU. The CPU then determines in step 212 whether eight bits are sent out. If NO in step 212, the operations in step 202 and the subsequent steps ar repeated.

However, if YES in step 202, the data word D (=1) is sent out in step 221. The count BAL of the counter set in step 201 is decremented by one in step 222. The flow then returns to step 212. Counting is started in step 222 for sampling the positive-direction pulse and is repeated at a predetermined interval corresponding to the bits B1 to B8. The count BAL in FIG. 1A is 6, the count BAL in FIG. 1B is 5, the counts BAL in FIGS. 1C to 1G are respectively 4 to 0, and the counts BAL in FIGS. 1H and 1I are respectively −1 and −2. The counts BAL in FIGS. 1C to 1G show positive-direction bits of the data words D, which correspond to the number of positive-direction bits in the correction pulses Pc. Therefore, the counts BAL are 6 to −2.

If YES in step 212, the CPU determines in step 231 whether BAL is larger than 4 and then in step 232 whether BAL is smaller than 0. If YES in step 231, the count BAL is reset to 4 in step 233. If YES in step 232, the count BAL is reset to 0. The values shown in FIGS. 1H and 1I are set in steps 233 and 234, respectively.

The CPU then determines in step 241 whether count BAL is equal to or less than zero. If YES in step 241, the correction pulse Pc (=0) is sent in step 232. However, if NO in step 243, the correction pulse Pc (=1) is sent. The count BAL of the counter is decremented by one in step 251 in the same manner as in step 222. The CPU then determines in step 212 by using the same counter as in step 212 whether four bits of the correction pulse Pc are completely sent. If NO in step 252, the operations in step 241 and the subsequent steps are repeated.

Figure 1:
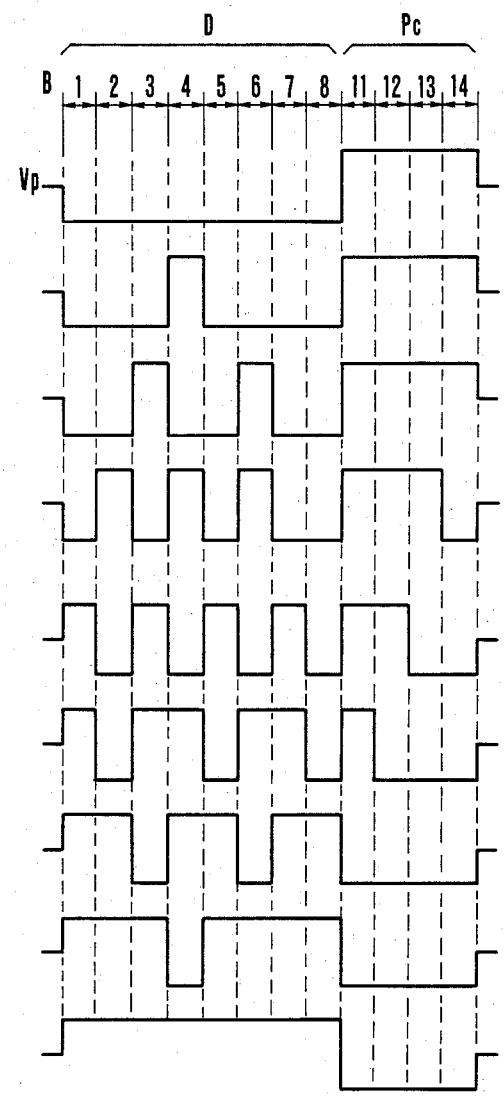
FIGS. 1A to 1I are timing charts of pulse signals to explain transmission conditions in a data transmission system of a key telephone system according to an embodiment of the present invention.

The number of negative-direction bits in the correction pulse Pc is determined according to the number of positive-direction bits of the data word D, as shown in FIG. 1. The change in average value on the basis of the positive-direction bits can be cancelled by the negative-direction bits.

However, if logic "1" is represented by the negative-direction bit, the number of negative-direction bits in the data word D is counted. The number of positive-direction bits in the correction pulse Pc may be determined on the basis of this count. As shown in FIG. 5, decrementation need not be performed. The number of opposite-direction bits may be determined by count-up operations.

It can be appreciated from the foregoing that the value of the counter BAL, when it is determined that eight bits have been sent at block 212, is indictive of the number of 1's to be added as correction bits. In the embodiment shown in FIGS. 1A-1I and in FIG. 5, wherein the number of correction bits is four, the content of the counter BAL is adjusted to a value within the range of values where corrections to the disparity are possible. This adjustment of the counter BAL occurs in steps 231 to 234. If desired these steps of adjustment may be skipped by branching directly from step 232 to step 241 in which case the value of BAL, when the answer at step 252 is yes, indicates the number of bits which are uncorrected.

Data from the ST 2 may be sent in the same manner as in FIG. 5. The present invention can be applied not only to the case wherein data is superposed on the DC voltage to send a pulse signal, but also to the case wherein only a negative- and positive-direction pulse signal is sent. The CNTs 11 and 21 may be constituted by various logic circuits. The arrangements of the SCs 12 and 22 and the RCs 13 and 23 may be arbitrarily determined according to given conditions. Although in the above embodiment, the pulse signal is a "0" or "1" bit pulse signal of an NRZ (Non-Return-to-Zero) scheme, a "0" or "1" bit pulse signal of an RZ (Return-to-Zero) scheme, or a binary "0" or "1" bit pulse signal may be used.

As is apparent from the above description, the change in average value of the one-direction pulse signal can be cancelled, and the pulse signal detection conditions at the receiving end can be correctly established. Therefore, the present invention can be effectively utilized in various types of key telephone systems for sending data by using the positive- and negative-direction pulse signal.

What is claimed is:

1. A system for transmitting data by a data pulse train, the data pulse train comprising a combination of data bit pulse signals each of which is characterized by either a first logic state or a second logic state, the data being transmitted through a pair of lines connected between a main unit and a key telephone set unit, comprising:
   for a unit transmitting data,
   counting means for sampling the data pulse train and counting data bit pulse signals of either said first or said second logic state;
   comparing means for comparing a count of said counting means with a reference value, said reference value being related to the number of bit pulse signals of said data pulse train and a correction pulse train; and
   correcting means for appending a plurality of correction bit pulse signals as said correction pulse train to said data pulse train such that the total number of bit pulse signals, of said data pulse train and of said correction pulse train, having said first logic state is made substantially equal to the total number of said bit pulse signals of said second logic state.

2. A system according to claim 1, wherein the bit pulse signal comprises an NRZ pulse signal.

3. A system according to claim 1, wherein the bit pulse signal comprises an RZ pulse signal.

4. A system according to claim 1, wherein operating power is supplied from said main unit to said key telephone set through speech and data signal lines conneted between said main unit and said key telephone set.

5. A system according to claim 1, wherein the correction pulse train is transmitted after the data pulse train.

6. A system according to claim 1, wherein
   the reference value is determind to be one half of the total number of bits of the data pulse train and the number of bits of the correction pulse train,
   said counting means comprises means for subtracting from the reference value the number of bit pulses in the data pulse train having either said first or said second logic state, and
   said correcting means performs correction processing on the basis of a content of said counting means after said count means completely counts the data pulse train.

7. A system according to claim 1, wherein the number of correction pulses is a constant.

8. A system according to claim 1, wherein the number of correction pulses is a multiple of 4 bits.

9. A system according to claim 1, wherein the number of correction pulses has a value proportional to the number of data bits transmitted during an interval of time.

10. A system for the serial transmission of a data word from a transmission station to a receiving station, the data word being transmitted as a sequential train of data bit signals each of which has either a first or a second logic state, comprising:
    means for counting the number of transmitted data bit signals of said data word having one of said logic states;
    means, responsive to the operation of said counting means, for determining the logic states of data bit signals of a correction data word which, when appended to said data word, will cause the total number of data bit signals of each of said logic states of both said data word and said correction data word to be substantially equal one to another; and
    means, responsive to the operation of said determining means, for generating said correction data word and for transmitting said correction data word subsequent to the transmission of said data word.

11. A system according to claim 10 wherein said data word is comprised of eight data bits and wherein said correction data word is comprised of four data bits.

12. A system according to claim 10 wherein said correction data word is comprised 4(n) data bits wherein n is an integer.

13. A system according to claim 10 wherein said correction data word is comprised of a number of data bits proprotional to a number of data word data bits transmitted per unit time.

14. A system according to claim 10 wherein said transmitting station comprises a main controlling unit and wherein said receiving station comprises a key telephone set.

15. A system according to claim 10 wherein said determining means comprises:
    means for comparing each of said data bit signals associated with said data word to a predetermined logic state for determining if individual ones of said data bit signals equal said predetermined logic state;
    means, responsive to the operation of said comparing means, for altering a value each time that one of said data bit signals is determined to be equal to said predetermined logic state, an initial magnitude of the value being related to the total number of data bit signals in said data word and in said correction data word; and
    means for evaluating the final magnitude of said value, after all of said data bit signals of said data word have been compared, for determining the logic state of each of said data bit signals of said correction data word such that the number of data bit signals, of said data word and of said correction data word, having said first logic state is made substantially equal to the number of data bit signals having said second logic state.

* * * * *